(12) United States Patent
Lee et al.

(10) Patent No.: US 7,705,952 B2
(45) Date of Patent: Apr. 27, 2010

(54) ELECTRONIC DEVICE WITH UNIFORM-RESISTANCE FAN-OUT BLOCKS

(75) Inventors: Ming-Chin Lee, Taipei (TW); Ming-Sheng Lai, Taiepi (TW)

(73) Assignee: AU Optronics Corporation, Hsinchu (TW)

( * ) Notice: Subject to any disclaimer, the term of this patent is extended or adjusted under 35 U.S.C. 154(b) by 264 days.

(21) Appl. No.: 11/593,551

(22) Filed: Nov. 7, 2006

(65) Prior Publication Data

US 2007/0195254 A1 Aug. 23, 2007

(30) Foreign Application Priority Data

Feb. 21, 2006 (TW) .............................. 95105826 A

(51) Int. Cl.
*G02F 1/1345* (2006.01)
(52) U.S. Cl. .................... 349/151; 349/149; 349/152
(58) Field of Classification Search ................ 349/149, 349/151, 152
See application file for complete search history.

(56) References Cited

U.S. PATENT DOCUMENTS

| | | | | |
|---|---|---|---|---|
| 6,104,465 | A * | 8/2000 | Na et al. ..................... | 349/152 |
| 2004/0239863 | A1* | 12/2004 | Liou et al. .................. | 349/152 |
| 2007/0002243 | A1* | 1/2007 | Kim .......................... | 349/139 |
| 2007/0085963 | A1* | 4/2007 | Huang et al. ................ | 349/152 |

FOREIGN PATENT DOCUMENTS

JP 10-153791 A 6/1998

* cited by examiner

*Primary Examiner*—Uyen-Chau N Le
*Assistant Examiner*—Kajli Prince
(74) *Attorney, Agent, or Firm*—Stout, Uxa, Buyan & Mullins, LLP

(57) ABSTRACT

The present invention provides an electronic device and manufacturing method thereof. The interconnecting leads of adjacent fan-out blocks have different heights along boundary area, thereby making the resistance of the adjacent interconnecting leads uniform and ensuring the quality of the electronic device.

18 Claims, 6 Drawing Sheets

US 7,705,952 B2

ELECTRONIC DEVICE WITH UNIFORM-RESISTANCE FAN-OUT BLOCKS

BACKGROUND OF THE INVENTION

1. Field of the Invention

The present invention relates to an electronic device with uniform-resistance fan-out blocks, and more particularly, to a thin film transistor liquid crystal display (TFT-LCD) panel with uniform-resistance fan-out blocks.

2. Description of the Prior Art

FIG. 1 shows a substrate 1 of a typical active matrix thin film transistor LCD panel, which generally includes an active area 10. The active area 10 includes data lines 12 and gate lines 14 which collectively carry signals to control transistor switches (not shown in FIG. 1) so as to drive pixels constructing an image on the display panel. Alternately, data lines 12 and gate lines 14 will be referred to as control lines in this specification. The portion surrounding the active area 10 is the out-lead bonding (OLB) area 16 which contains some bonding areas 20. Each bonding area 20 includes multiple bonding pads to be coupled with external driving integrating circuits (ICs) or drivers. Moreover, there are many fan-out blocks 15 formed between control lines (12, 14) and the bonding area 20 in the OLB area 16. Each fan-out block 15 includes multiple interconnecting leads, and each interconnecting lead is electrically connected to a control line (12, 14) at one end and connected to a bonding pad in the bonding pad area 20 at the other end for further connecting to external driving ICs.

Usually the pitch between adjacent interconnecting leads at the external driving IC side is far less than that at control line (12, 14) side in a typical fan-out block, and therefore the interconnecting leads of a fan-out block tend to have different lengths. Without special routing, for example, the outmost interconnecting lead will be far longer than the one in the medial portion of a fan-out block. Since the resistance of an interconnecting lead is proportional to its length, interconnecting leads of a fan-out block are prone to have different resistances. Such difference of resistances may impact the time delay and quality of control signals from external driving ICs and may thus downgrade the entire image quality. To resolve such problem, many works have been done for providing interconnecting leads with uniform resistance in a single fan-out block, such as the techniques disclosed in U.S. Pat. Nos. 6,104,465, 5,757,450, 6,683,669 and 6,842,200. Generally, these techniques can improve and achieve uniform resistance, i.e., make the resistance between adjacent interconnecting leads in a fan-out block substantially identical.

Although uniform resistance in a single fan-out block can be achieved by the techniques mentioned in above patents, the inventors of the present invention found that the resistances of interconnecting leads among fan-out blocks in the OLB area 16 may have non-negligible differences. Especially when the difference in resistance between the adjacent outmost interconnecting leads of two adjacent fan-out blocks is too large (more than 10Ω, for example), the resulted image quality is liable to be degraded. FIG. 2 shows adjacent bonding areas (20a, 20b) and the corresponding fan-out blocks (A, B). The adjacent region 5 of the two adjacent fan-out blocks (A, B) is highlighted and indicated by a circle. Driving ICs coupled to bonding area 20a and 20b may be either ICs of different specification or partially connected with some floating pins. In such cases, it is possible that the difference in resistance between adjacent outmost interconnecting leads of the two adjacent fan-out blocks (A, B) is too large to be neglected. In view of foregoing, there is a need to provide an improved fan-out block structure and method to resolve the problem associated with non-uniformity in resistance between adjacent fan-out blocks.

SUMMARY OF THE INVENTION

In view of the problem of non-uniformity in resistance between adjacent fan-out blocks in conventional LCD panels, one object of the present invention is to provide an electronic device, such as an LCD panel, which has uniform resistance between adjacent interconnecting leads of two adjacent fan-out blocks so as to ensure the image quality thereof.

It is another object of the present invention to provide an electronic device, such as an LCD panel, and a manufacturing method therefor such that the adjacent interconnecting leads of two adjacent fan-out blocks have uniform resistance to ensure the operation quality.

According to above objects, the present invention provides an electronic device having fan-out blocks with uniform-resistance interconnecting leads and the manufacturing method therefor. The fan-out block includes at least a first routing portion, a second routing portion, and an intermediate portion. Preferably, the intercept lengths of the second routing portions of two adjacent outmost interconnecting leads of adjacent fan-out blocks are different. Thereby, the resistance in adjacent outmost interconnecting leads of adjacent fan-out blocks is made substantially identical.

DETAILED DESCRIPTION OF THE INVENTION

Figure 1:
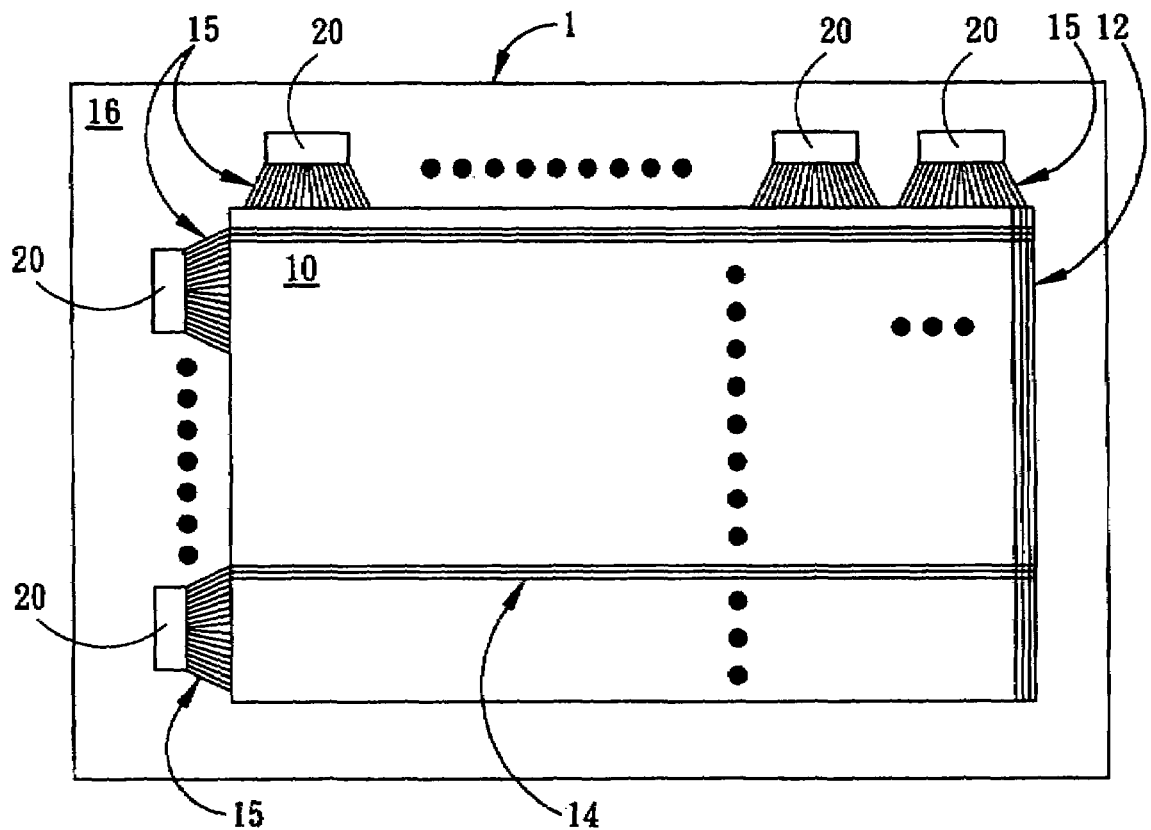
FIG. 1 shows a substrate of a typical active matrix thin film transistor LCD panel.
Figure 2:
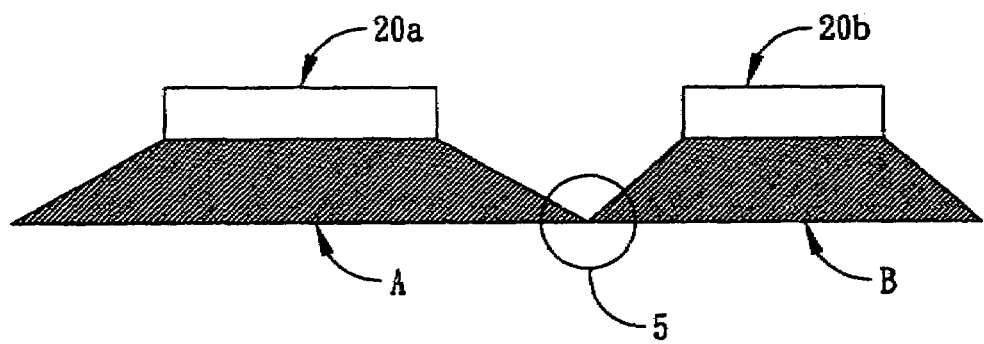
FIG. 2 shows adjacent bonding areas and the corresponding fan-out blocks, where the adjacent region of the two adjacent fan-out blocks is also highlighted in the figure.
Figure 3:
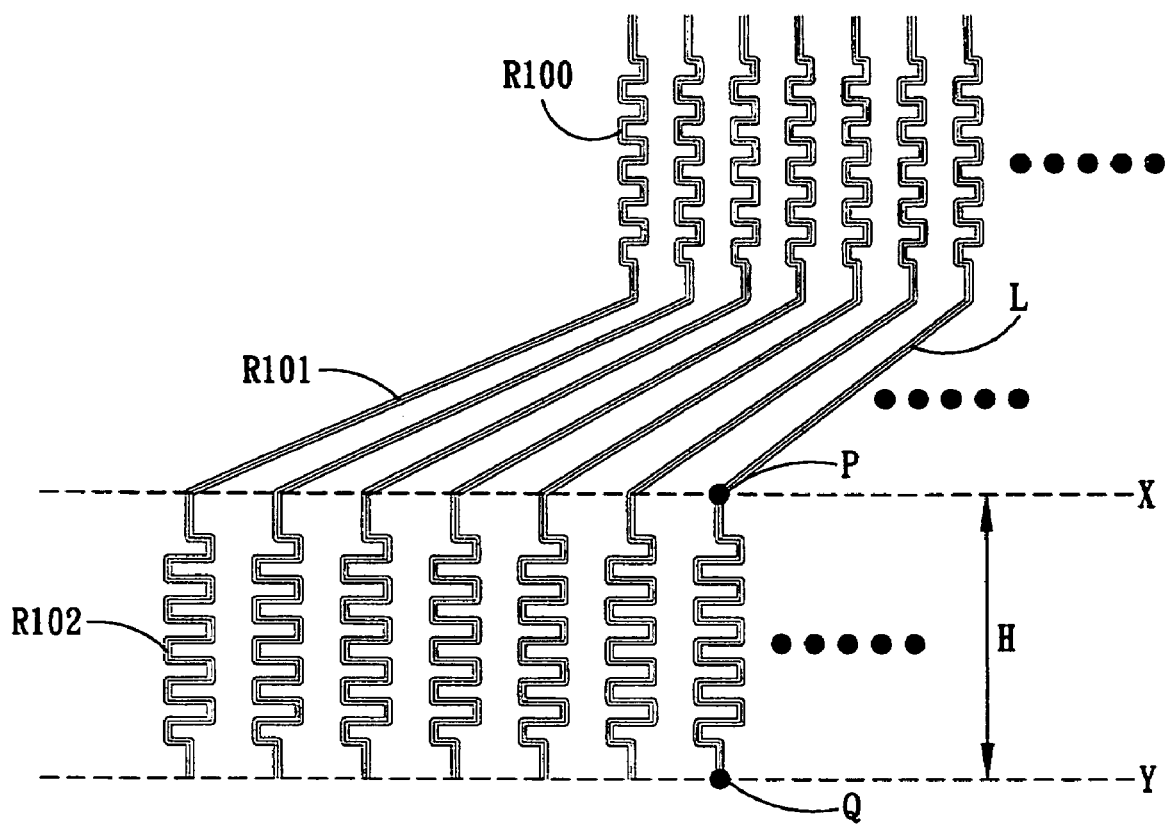
FIG. 3 shows an embodiment of the layout of a fan-out block in accordance with the present invention.

Except fan-out blocks, the structure of elements of the LCD panel disclosed in the embodiments of the present invention is identical with that shown in FIG. 1. The description about the structure of a general LCD panel shown in FIG. 1 is thus applicable for the present invention. FIG. 3 shows an embodiment of the layout of a fan-out block in accordance with the present invention, which includes multiple interconnecting leads L, each interconnecting lead L at least including three portions: the first routing portion R100 coupled to bonding pads in bonding area 20 (FIG. 1) and electrically connected with external driving IC(s), the second routing portion R102 connected with data lines 12 or gate lines 14, and the intermediate portion R101 locating and connecting between the first routing portion R100 and the second routing portion R102. In contrast with the second routing portion R102, the first routing portion R100 has a smaller pitch between adjacent interconnecting leads. Referring to FIG. 3, the distance between point P and Q is referred to as the intercept length or the height of the interconnecting lead L in the second routing portion R102, where P is the intersection point between the interconnecting lead L and an imaginary line X which is the intersection line of the second routing portion R102 and the intermediate portion R101, as shown in FIG. 3, and Q is an external connecting point lying on the interconnecting lead L. Alternatively, Q can be referred as the intersection point of the interconnecting lead L and an imaginary line Y formed by intersecting the second routing portion R102 with the active area 10 shown in FIG. 1. Variant routing trace style may be employed in the second routing portion R102 and/or the first routing portion R100, such as a straight line, a bow-shaped line, a zigzag line, a serpentine line, or the combination thereof, as long as the effective length and the resulted resistance of interconnecting leads can be increased. Although the interconnecting leads in the intermediate portion R101 are straight lines in the embodiment, other type of routing trace can be used therefor if necessary. Moreover, interconnecting lead segments in adjacent routing portion (such as R101 and R102) intersect with each other in an angle other than 180 degree (for example at point P) in the present embodiment. The intersecting angle thereof, however, can be 180 degree, i.e., an interconnecting lead can be a straight line through adjacent routing portion (such as R101 and R102) without any "turn" at the intersection point. Furthermore, although the interconnecting leads in the second routing portion R102 are illustrated to be perpendicular to the imaginary line Y formed by points connecting to data lines 12 or gate lines 14 in the present embodiment, they may intersect with each other in an angle of any degree.

Figure 4A:
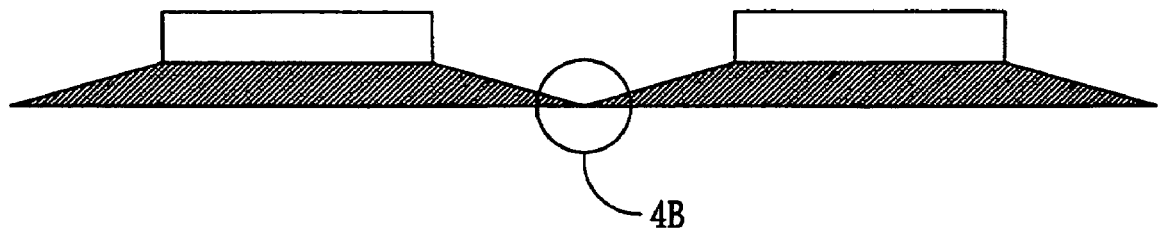
FIG. 4A shows adjacent bonding areas and fan-out blocks as well as highlights the adjacent region therebetween.
Figure 4B:
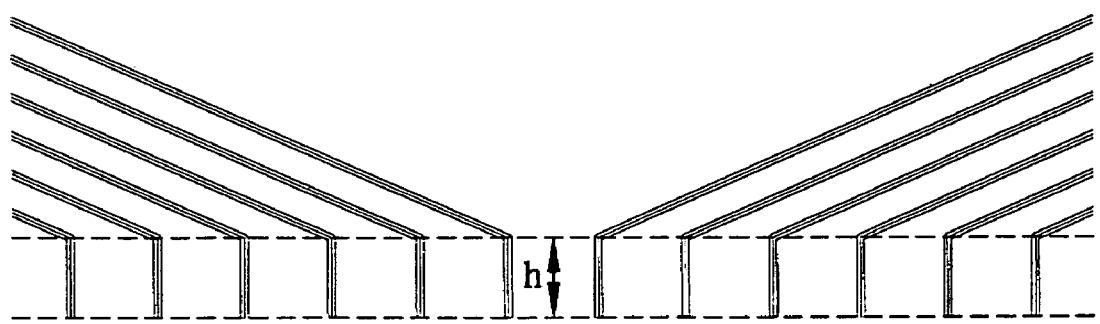
FIG. 4B shows an enlarged view of the adjacent region highlighted in FIG. 4A, which adopts the same conventional routing scheme in both adjacent fan-out blocks.

FIG. 4A shows adjacent bonding areas and fan-out blocks as well as highlights the adjacent region 4B therebetween. FIG. 4B shows an enlarged view of the adjacent region 4B which adopts the same conventional routing scheme in both adjacent fan-out blocks. In contrast with the embodiment of fan-out block routing scheme shown in FIG. 3, the interconnecting leads are straight lines in the second routing portions of the conventional fan-out blocks shown in FIG. 4B and all have the same intercept length h.

Figure 5:
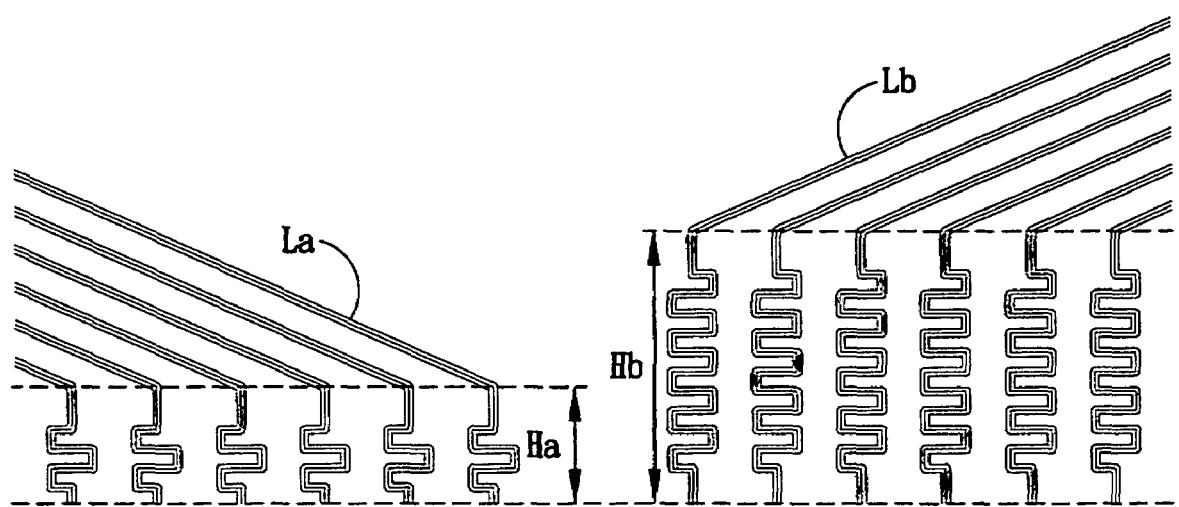
FIG. 5 shows an embodiment of adjacent fan-out blocks in an LCD panel in accordance with the present invention.

FIG. 5 shows an embodiment of adjacent fan-out blocks in an LCD panel in accordance with the present invention, which shows the second routing portion and part of the intermediate portion only and omits the first routing portion. In the present invention, the intercept lengths (Ha, Hb) of the second routing portions of two adjacent outmost interconnecting leads of adjacent fan-out blocks are different in a manner that makes the resistance in the adjacent outmost interconnecting leads substantially identical or uniform, or the difference in resistance therebetween is under 10Ω. The method to implement the embodiment is to select a fan-out block (the one at the left side in FIG. 5, for example) as the reference fan-out block, then to construct another fan-out block (the one at the right side in FIG. 5) with respect to the reference one. During the process of forming adjacent fan-out blocks, the resistance of the outmost interconnecting lead La in the reference fan-out block should be measured at first. If the adjacent interconnecting lead Lb has a resistance less than that of La, then the intercept length Hb of the interconnecting lead Lb should be lengthened. On the contrary, if the adjacent interconnecting lead Lb has a resistance larger than that of La, then the intercept length Hb of the interconnecting lead Lb should be shortened. After the intercept length Hb is determined, it may subsequently determine the routing style of the fan-out block in a manner such that resistance uniformity or negligible resistance difference between adjacent interconnecting leads in adjacent fan-out blocks is achieved. Besides the difference in resistance between adjacent interconnecting leads is under 10Ω, when the ratio of the maximum resistance to the minimum resistance of all interconnecting leads is under 3, a qualified image quality can be expected. The routing in the second routing portion may be constructed first. When the intercept length Hb can not meet the resistance uniformity perfectly, the routing in the first routing portion can then be constructed. Nevertheless, it is also feasible to first construct the routing in the first routing portion followed by routing in the second routing portion if necessary. Regarding to routing trace style, it is feasible to adopt schemes such as a bow-shaped routing, a zigzag routing, or a serpentine routing. It is also applicable to change the width, thickness, or material of interconnecting leads to increase or decrease the resistance if necessary. Although the present invention is illustrated by embodiments of LCD panels, it is applicable to other electronic devices to attain uniform resistance between adjacent interconnecting leads in adjacent fan-out blocks.

Figure 6:
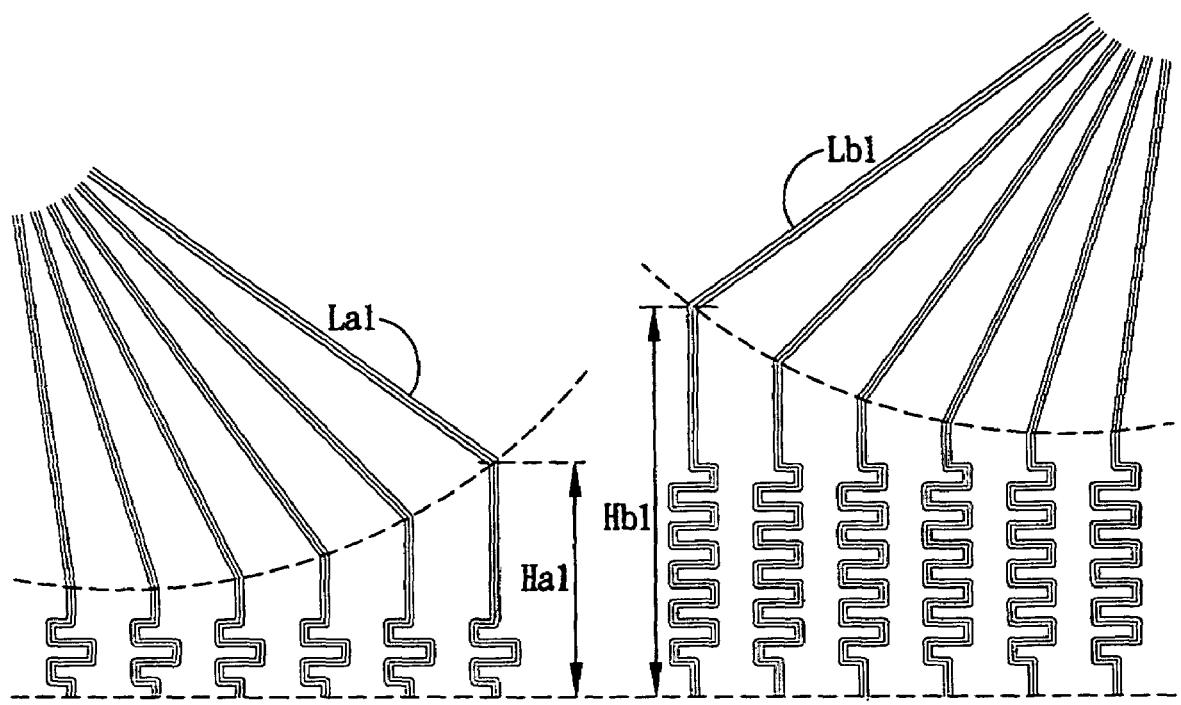
FIG. 6 shows another embodiment of adjacent fan-out blocks in an LCD panel in accordance with the present invention.

The embodiment shown in FIG. 5 has interconnecting leads with identical intercept lengths within the same fan-out block, in other words, the intercept lengths of interconnecting leads in the reference fan-out block at the left side are all equal to Ha and the intercept lengths of interconnecting leads in the adjacent fan-out block at the right side are all equal to Hb. The intercept lengths of interconnecting leads in the same fan-out block, however, can be different if necessary in the present invention, as illustrated in another embodiment shown in FIG. 6. In the embodiment shown in FIG. 6, besides following the rule that the intercept length Ha1 of the outmost interconnecting lead La1 in the reference fan-out block is different from the intercept length Hb1 of the outmost interconnecting lead Lb1 in the adjacent fan-out block, intercept lengths of interconnecting leads in the second routing portion of an individual fan-out block are also different. As can be noted in FIG. 6, the imaginary boundary formed by the intersection between routing portions is thus a curve instead of a straight line. Likewise, this embodiment is also embodied in a manner such that the interconnecting leads in adjacent fan-out blocks have uniform resistance to ensure image quality.

Figure 7:
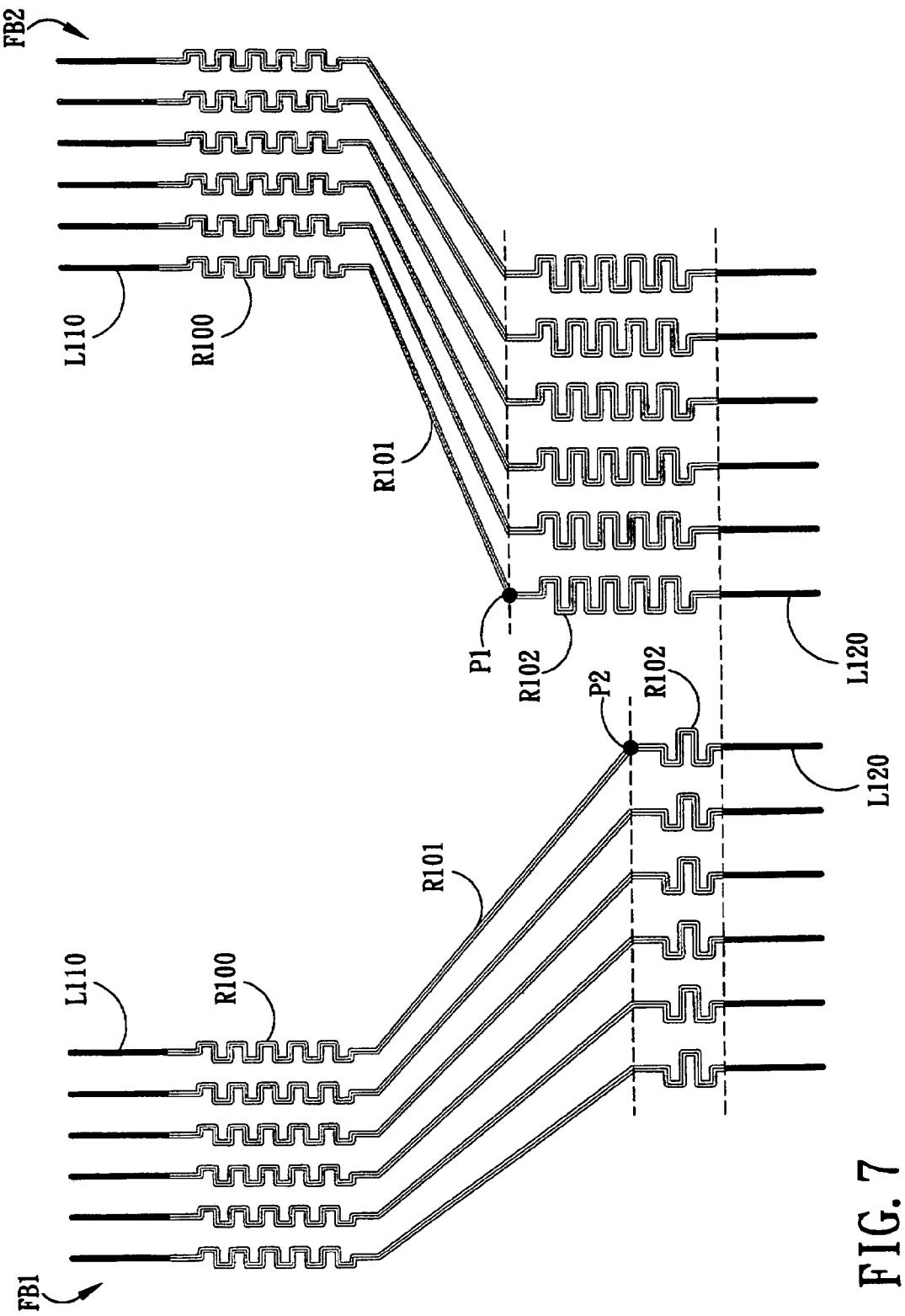
FIG. 7 shows another embodiment of adjacent fan-out blocks in accordance with the present invention.

FIG. 7 shows another embodiment of adjacent fan-out blocks in accordance with the present invention. FIG. 7 includes two adjacent fan-out blocks FB1 and FB2 respectively containing a plurality of interconnecting leads. Each interconnecting lead has a first routing portion R100, an intermediate portion R101, and a second routing portion R102. Each interconnecting lead is connected with a first lead L110 and a second lead L120 respectively through the first routing portion R100 and the second routing portion R102 thereof. Particularly, the intercept lengths (the distance between P1 and the connecting second lead L120, and the distance between P2 and the connecting second lead L120) of the second routing portions of two adjacent outmost interconnecting leads of adjacent fan-out blocks FB1 and FB2 are different. In an LCD panel, the first leads L110 with smaller pitches are typically connected to bonding pads which in turn coupled with external driving Ics. One the other hand, the second leads L120 are connected to gate lines or data lines.

Although only preferred embodiments have been illustrated and described, it will be appreciated by those skilled in the art that various modifications may be made without departing from the scope of the present invention, which is intended to be limited solely by the appended claims.

What is claimed is:

1. An electronic device comprising:
   a plurality of first leads;
   a plurality of second leads; and
   at least two fan-out blocks adjacent to each other and respectively connected between the first leads and the second leads, each of said fan-out blocks comprising a plurality of interconnecting leads, each of the interconnecting leads having:
      a first routing portion coupled to one of the first leads;
      a second routing portion coupled to one of the second leads; and
      an intermediate portion located between the first routing portion and the second routing portion, the intermediate portion and the second routing portion meeting at an intersection point, wherein a segment between the intersection point and the second lead is defined as an intercept length of the second routing portion;
   wherein the intercept lengths of the second routing portions of two adjacent outmost interconnecting leads of said adjacent fan-out blocks are different.

2. The electronic device as claimed in claim 1, wherein the second routing portion of each of said interconnecting leads has routing trace style of a straight line, a bow-shaped line, a zigzag line, a serpentine line, or a combination thereof.

3. The electronic device as claimed in claim 1, wherein the first routing portion of each of said interconnecting leads has routing trace style of a straight line, a bow-shaped line, a zigzag line, a serpentine line, or a combination thereof.

4. The electronic device as claimed in claim 1, wherein said electronic device is an LCD panel, said first leads connecting with a plurality of bonding pads in a bonding area of said LCD panel.

5. The electronic device as claimed in claim 4, wherein said second leads comprise data lines of said LCD panel.

6. The electronic device as claimed in claim 4, wherein said second leads comprise gate lines of said LCD panel.

7. The electronic device as claimed in claim 1, wherein difference in resistance between said two adjacent outmost interconnecting leads in said adjacent fan-out blocks is less than 10Ω.

8. The electronic device as claimed in claim 1, wherein said interconnecting leads in each of said fan-out blocks have uniform resistance.

9. The electronic device as claimed in claim 8, wherein a ratio of maximum resistance to minimum resistance of said interconnecting leads in each of said fan-out blocks is less than 3.

10. A method of generating a circuit on a substrate, the circuit having uniform resistance for an electronic device, the method comprising:
    providing a plurality of first leads and a plurality of second leads;
    constructing a first fan-out block connecting between the first leads and the second leads, said first fan-out block comprising a plurality of interconnecting leads, each of the interconnecting leads having:
       a first routing portion coupled to one of the first leads;
       a second routing portion coupled to one of the second leads; and
       an intermediate portion located between the first routing portion and the second routing portion, the intermediate portion and the second routing portion meeting at an intersection point, wherein a segment between the intersection point and the second lead is defined as an intercept length of the second routing portion;
    constructing a second fan-out block adjacent to said first fan-out block, wherein the intercept lengths of the second routing portions of two adjacent outmost interconnecting leads in said second fan-out block and said first fan-out block are different; and
    constructing routing in the second routing area and the first routing area in said second fan-out block.

11. The method as claimed in claim 10, wherein said electronic device is an LCD panel, said first leads connecting with a plurality of bonding pads in a bonding area of said LCD panel.

12. The method as claimed in claim 10, wherein the second routing portion of each of said interconnecting leads has routing trace style of a straight line, a bow-shaped line, a zigzag line, a serpentine line, or a combination thereof.

13. The method as claimed in claim 10, wherein said routing in the second routing area is constructed before said routing in the first routing area.

14. The method as claimed in claim 10, wherein said routing in the second routing area is constructed after said routing in the first routing area.

15. The method as claimed in claim 10, wherein:
    if the outmost interconnecting lead in said second fan-out block has a resistance less than the resistance of the outmost interconnecting lead in said first fan-out block, then the intercept length of the outmost interconnecting lead in said second fan-out block is longer than the intercept length of the outmost interconnecting lead in said first fan-out block; and
    if the outmost interconnecting lead in said second fan-out block has a resistance larger than the resistance of the outmost interconnecting lead in said first fan-out block, then the intercept length of the outmost interconnecting lead in said second fan-out block is shorter than the intercept length of the outmost interconnecting lead in said first fan-out block.

16. The method as claimed in claim 10, wherein difference in resistance between said two adjacent outmost interconnecting leads in said first fan-out block and said second fan-out block is less than 10Ω.

17. The method as claimed in claim 10, wherein said interconnecting leads have uniform resistance respectively in said first fan-out block and said second fan-out block.

18. The method as claimed in claim 17, wherein a ratio of maximum resistance to minimum resistance of said interconnecting leads is less than 3 respectively in said first fan-out block and said second fan-out block.

* * * * *